US012619616B2

(12) United States Patent
Fox et al.

(10) Patent No.: US 12,619,616 B2
(45) Date of Patent: May 5, 2026

(54) ETHICAL VIRTUAL ASSISTANT TRAINING PLATFORM

(71) Applicant: International Business Machines Corporation, Armonk, NY (US)

(72) Inventors: Jeremy R. Fox, Georgetown, TX (US); Fernando Luiz Koch, Palm Beach Gardens, FL (US); Martin G. Keen, Cary, NC (US); Jessica Nahulan, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/931,908

(22) Filed: Oct. 30, 2024

(65) Prior Publication Data
US 2026/0119508 A1 Apr. 30, 2026

(51) Int. Cl.
*G06F 7/00* (2006.01)
*G06F 16/23* (2019.01)
(Continued)

(52) U.S. Cl.
CPC .... *G06F 16/24575* (2019.01); *G06F 16/2365* (2019.01); *G06N 20/00* (2019.01)

(58) Field of Classification Search
CPC ............... G06N 20/00; G06F 16/2365; G06F 16/24575
(Continued)

(56) References Cited

U.S. PATENT DOCUMENTS

| | | | |
|---|---|---|---|
| 11,806,629 | B2 | 11/2023 | Donovan |
| 2021/0299576 | A1 | 9/2021 | Donovan |

(Continued)

FOREIGN PATENT DOCUMENTS

| | | |
|---|---|---|
| CN | 111860133 A | 10/2020 |
| IN | 202411010843 A | 2/2024 |

OTHER PUBLICATIONS

IBM, "AI ethics", retrieved from web https://www.ibm.com/impact/ai-ethics dated Dec. 12, 2024, 15 pages.
(Continued)

*Primary Examiner* — Isaac M Woo
(74) *Attorney, Agent, or Firm* — Garg Law Firm, PLLC; Rakesh Garg; Michael O'Keefe

(57) ABSTRACT

An embodiment establishes a population database. The embodiment constructs a behavior framework based on population data stored on the population database. The embodiment initiates a training process to train a virtual assistant to generate an output response in response to a query, including training the virtual assistant to generate responses according to the behavior framework. The embodiment monitors an interaction session between a client interacting with the virtual assistant to detect a deviation from the behavior framework. The embodiment generates, upon detection of the deviation from the behavior framework, a correction action to apply to a portion of the interaction session corresponding to the deviation from the behavior framework. The embodiment applies the correction action to the portion of the interaction session corresponding to the deviation from the behavior framework. The embodiment outputs a corrected output response that meets a set of guidelines of the behavior framework.

17 Claims, 7 Drawing Sheets

(51) Int. Cl.
  _G06F 16/2457_      (2019.01)
  _G06N 20/00_       (2019.01)

(58) Field of Classification Search
  USPC .................................................. 707/600–899
  See application file for complete search history.

(56)                    References Cited

U.S. PATENT DOCUMENTS

2024/0071596 A1 *   2/2024   Bradley ................. G06N 20/00
2024/0273431 A1 *   8/2024   Maikhuri .............. G06N 3/044

OTHER PUBLICATIONS

IBM, "What is explainable AI?", retrieved from web https://www.ibm.com/topics/explainable-ai dated Dec. 12, 2024, 11 pages.
Hjelmtveit, Kevin, "Moderating Respectful Conversations Using Reinforcement Q-Learning and Markov Decision Process Approaches," Considering Toxicity in Speech, Dec. 2023, 98 pages.
Da Silva et al., "Could a Conversational AI Identify Offensive Language?," Information, Oct. 12, 2021, 28 pages, vol. 12, No. 10.
Vakkuri et al., "ECCOLA—A method for implementing ethically aligned AI systems", The Journal of Systems and Software, Dec. 2021, 16 pages.
Yuan et al., "R-Judge: Benchmarking Safety Risk Awareness for LLM Agents," arXiv:2401.10019v2 [cs.CL], Feb. 18, 2024, 21 pages.

* cited by examiner

600

ETHICAL VIRTUAL ASSISTANT TRAINING PLATFORM

BACKGROUND

The present invention relates generally to virtual assistants. More particularly, the present invention relates to a method, system, and computer program for an ethical virtual assistant training platform.

Artificial intelligence (AI) technology has evolved significantly over the past few years. Modern AI systems are achieving human level performance on cognitive tasks like converting speech to text, recognizing objects and images, or translating between different languages. This evolution holds promise for new and improved applications in many industries. Accordingly, AI systems may be designed for various tasks that traditional computer systems were previously incapable.

An Artificial Neural Network (ANN)—also referred to simply as a neural network-is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex. An ANN today might have upwards of billions of interconnected "neuron" processor units, though may be trained using a far fewer number of dedicated hardware processor units (e.g., GPUs). Further, ANNs can be designed to uncover relationships between previously unknown factors and accomplish tasks that were previously incapable by a human being alone.

Virtual assistants today can be programmed to do a variety of tasks. These may include answering queries and providing assistive actions to users of applications to respond to user inquiries, offer recommendations, and guide users through tasks or processes within an application. Virtual assistants may utilize natural language processing (NLP) algorithms to understand user queries, commands, and interactions, and provide seamless communication and interaction within a platform or system. Further, virtual assistants may be programmed to assist in workflow optimization by streamlining processes, suggesting improvements, and enhancing operational efficiency. Virtual assistants may be programmed with consideration of regulations, policies, and governance standards, offering guidance on ethical considerations, data privacy, and security practices. By programming virtual assistants to perform these technical tasks and provide assistive actions to users, systems can leverage AI technology to streamline operations and improve user experiences.

SUMMARY

The illustrative embodiments provide for an ethical virtual assistant training platform. An embodiment includes establishing a population database, such that the population database is configured to transmit and store population data. The embodiment also includes constructing a behavior framework based on population data stored on the population database. The embodiment also includes initiating a training process to train a virtual assistant to generate an output response in response to a query, such that the training process includes training the virtual assistant to generate responses according to the behavior framework. The embodiment also includes monitoring an interaction session between a client interacting with the virtual assistant to detect a deviation from the behavior framework. The embodiment also includes generating, upon detection of the deviation from the behavior framework, a correction action to apply to a portion of the interaction session corresponding to the deviation from the behavior framework. The embodiment also includes applying the correction action to the portion of the interaction session corresponding to the deviation from the behavior framework. The embodiment also includes outputting a corrected output response, such that the corrected output response meets a set of guidelines of the behavior framework.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
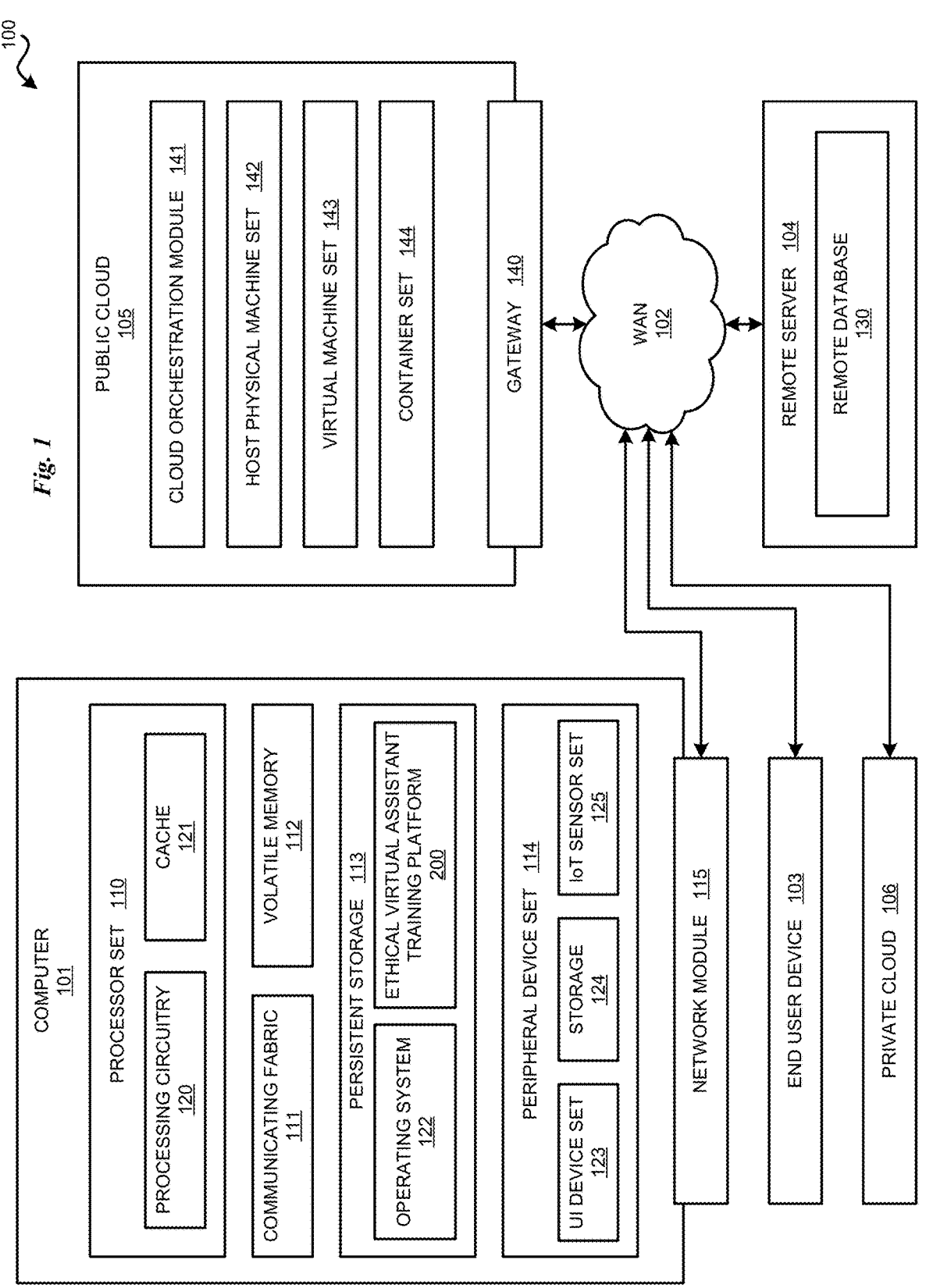
FIG. 1 depicts a block diagram of a computing environment in accordance with an illustrative embodiment.

In today's digital world, diversity, equality, and inclusion (DEI) are essential for promoting ethical and responsible technology use. As technology becomes increasingly integrated into our daily lives, it is crucial that all individuals have access to digital tools and resources, regardless of their background or identity.

Also, it is important to ensure that technological advancements do not perpetuate existing social inequalities. For instance, algorithms used in machine learning and artificial intelligence can inadvertently reinforce biases if they are not designed with fairness in mind. Therefore, it is essential to develop and use technology in a way that promotes equality and does not reinforce unfair power dynamics.

Technological advancement in digital technologies such as cloud computing, microservices architecture, and natural language processing have created new opportunities for developers to create more sophisticated and responsive digital assistants. However, without a focus on ethical decision-making, these technologies risk perpetuating existing power dynamics and exacerbating social inequalities. By incorporating ethical considerations into the design of digital assistants, embodiments of the present disclosure ensure that technology is used for the betterment of all people within society as a whole.

Embodiments of the present disclosure address the need for ethical digital companions that support diversity, equality, and inclusion (DEI) goals in the digital world. As technology becomes increasingly integrated into the daily lives of all people, the potential for unethical and biased decision-making grows. Accordingly, currently existing digital assistants and AI systems are often susceptible to perpetuating harmful biases and reinforcing unfair power dynamics.

Embodiments of the present disclosure leverage nuanced understanding of ethical and moral frameworks, enabling virtual assistants to engage in conscious interactions that promote subjective goals, such as for example, diversity, equality, and inclusion related goals. By incorporating a wide range of ethical viewpoints from various cultures and social groups, embodiments of the present disclosure offer users a more inclusive and equitable experience when interacting with a digital assistant. Additionally, the use of machine learning algorithms and decision-making frameworks enables the digital assistant to learn from user feedback and improve ethical decision-making abilities over time.

Accordingly, the present disclosure addresses the deficiencies described above by providing a process (as well as a system, method, machine-readable medium, etc.) that develops an ethical digital assistant training platform that leverages a behavioral knowledge base framework and reinforcement learning to train an ethically cognizant digital assistant. Embodiments of the present disclosure include monitoring interaction to detect bias behavior and reacting in response to detecting bias. Embodiments of the present disclosure include monitoring interaction to detect compliance with an ethical behavior framework during interactions. Embodiments of the present disclosure include a programmable interface enabling a user having sufficient privileges to define ethical behavior frameworks and adjust any parameters and/or settings related to training one or more digital assistants via the ethical digital assistant training platform. In an embodiment, the system may include an ethical digital assistant training platform. In an embodiment, the platform includes a bias detection and correction (BDC) mechanism. In an embodiment, the platform includes an ethical compliance interface (ECI).

In an embodiment, the system may include one or more deep learning mechanisms. For example, at least one deep learning mechanism may be configured to train an ethical digital assistant. In an embodiment, training the ethical digital assistant may include a supervised learning technique, an unsupervised learning technique, a human-in-the-loop, training technique, and/or any combination thereof. In an embodiment, the deep learning mechanism may include elements of an RNN, GAN, LTSM, Transformer, and/or any combination thereof.

In an embodiment, one or more deep learning algorithms may be trained to learn patterns and relationships from historical data to make informed decisions that align with a behavior framework. Further, one or more deep learning algorithms may be trained to recognize bias in an output response. Further, one or more deep learning algorithms may be trained to predict potential bias impact resultant from adjust to a component of a system. Further, one or more deep learning algorithms may be trained to generate a correction action that mitigates the detected output potentially bias response, action, and/or impact. In an embodiment, at least one deep learning mechanism may be configured, trained, fine-tuned, tailored, optimized, etc. to enable the system to extract features responsible for producing bias outputs, and to consider subjective factors related to interactions that influence generation of bias outputs. In an embodiment, the system includes an optimization mechanism. The optimization mechanism may be configured to set the goals for the system, which may include, for example, meeting all of a criteria of a set of guidelines of an behavior framework, maximizing a compliance score associated with the output response measuring adherence of the output response to the behavior framework, and/or any other user defined goals.

The illustrative embodiments provide for an ethical digital assistant training platform. As used throughout the present disclosure, the term "digital assistant" refers to a software application configured to provide interactive and personalized assistance to users in various tasks, such as answering questions, performing tasks, providing recommendations, and facilitating interactions within digital environments. Digital assistants utilize natural language processing, machine learning, and other AI technologies to understand user queries, interpret context, and generate relevant responses or actions., and often operate through voice commands, text inputs, or other forms of input communication. Further, digital assistants are commonly integrated into devices, applications, and platforms to enhance user experiences, streamline tasks, and/or provide support and guidance in navigating digital environments. As used throughout the present disclosure, the terms "virtual assistant", "digital assistant", "digital agent", "digital companion", and like terms may be used interchangeably unless otherwise indicated by the context.

As used throughout the present disclosure, the term "platform" refers to a software and/or or hardware environment that serves as an infrastructure for running applications, services, or other related technologies. A platform may provide a set of tools, resources, and services that enable developers to build, deploy, and manage software applications or systems. Platforms typically include operating systems, programming languages, libraries, frameworks, and APIs that facilitate the development and execution of different software applications and/or services. Example types of platforms may include, but are not limited to, operating systems platforms, cloud computing platforms, development platforms, and application platforms. In an embodiment, the platform may be tailored to specific use cases and requirements.

In an embodiment, the digital assistant can be integrated into the platform to monitor the development process by analyzing code repositories, version control systems, and development workflows. Embodiments include tracking changes, updates, and modifications made to the platform's codebase, architecture, or features, providing real-time feedback on the impact of these changes on system performance, security, and ethical compliance. Further, the digital assistant can flag potential ethical concerns, vulnerabilities, or biases in the development process, guiding developers to address these issues proactively and in alignment with the behavior framework.

In an embodiment, the digital assistant can monitor user interactions within the platform to gather insights on user behavior, preferences, and feedback. By analyzing user queries, responses, and actions, the digital assistant can identify patterns, trends, and ethical considerations that inform the development of the system. In an embodiment, the digital assistant can provide recommendations, suggestions, or alerts to the system, developers and/or stakeholders on how to improve user experiences, address ethical dilemmas, and enhance the platform's functionality in accordance with the behavior framework.

As used throughout the present disclosure, the term "behavior framework" refers to a set of guidelines, principles, rules, standards, and/or criteria that define acceptable behavior of a virtual assistant interacting with a user. In an embodiment, the behavior framework may include ethical considerations, values, and behaviors that guide decision-making and actions within a specific context or system. In an embodiment, the virtual assistant adheres to the behavior framework when making decisions, interacting with others, and addressing ethical dilemmas. In an embodiment, the behavior framework provides a framework for evaluating the ethical implications of actions, behaviors, and responses, thereby integrating ethical considerations into decision-making processes and behaviors within the defined system or environment.

As used throughout the present disclosure, the term "bias" refers to systematic errors or inaccuracies in a model's predictions or decisions that result from the model's inability to represent the true relationship between the input data and the output. Bias can arise when a model makes assumptions that do not hold true for the data, leading to consistent errors in prediction or classification. In machine learning, bias is a type of error that occurs when the model is too simplistic or makes incorrect assumptions about the data, resulting in a lack of accuracy or generalization in its predictions.

Inherent bias in a system may include the presence of preconceived notions, prejudices, or unfair treatment that can influence the outcomes or decisions produced by the system. In machine learning systems, inherent bias can manifest in the form of biased training data, biased algorithms, or biased decision-making processes that result in discriminatory or unfair outcomes. Inherent bias can lead to systematically skewed results that favor certain groups or perspectives over others, perpetuating inequalities and reinforcing existing biases within the system. Embodiments of the present disclosure consider identifying and correcting identified bias in machine learning systems.

Illustrative embodiments include establishing a population database, such that the population database is configured to transmit and store population data. Embodiments also include constructing a behavior framework based on population data stored on the population database. Embodiments also include initiating a training process to train a virtual assistant to generate an output response in response to a query, such that the training process includes training the virtual assistant to generate responses according to the behavior framework. Embodiments also include monitoring an interaction session between a client interacting with the virtual assistant to detect a deviation from the behavior framework. Embodiments also include generating, upon detection of the deviation from the behavior framework, a correction action to apply to a portion of the interaction session corresponding to the deviation from the behavior framework. Embodiments also include applying the correction action to the portion of the interaction session corresponding to the deviation from the behavior framework. Embodiments also include outputting a corrected output response, such that the corrected output response meets a set of guidelines of the behavior framework.

Embodiments of the present disclosure provide a method and system to support ethical digital companions, equipped with conscious interaction, moral frameworks, and ethical guardrails to promote diversity, equality, and inclusion in the digital world. Embodiments of the present disclosure provide a nuanced understanding of ethical viewpoints from various cultures and social groups and utilizing machine learning algorithms to improve ethical decision-making abilities over time. An embodiment includes a method and system to support ethical digital companions in diversity, equality, and inclusion policies. An embodiment includes a method of monitoring ethical compliance during an interaction session with a digital companion. An embodiment includes a method of detecting and reacting to bias behavior detected during an interaction session. An embodiment includes a method for providing customizable behavior settings.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an ethical virtual assistant training platform 200 may be configured to continuously train a virtual assistant to provide assistive actions in response to user queries that adhere to a computer derived behavior framework. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile.

In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
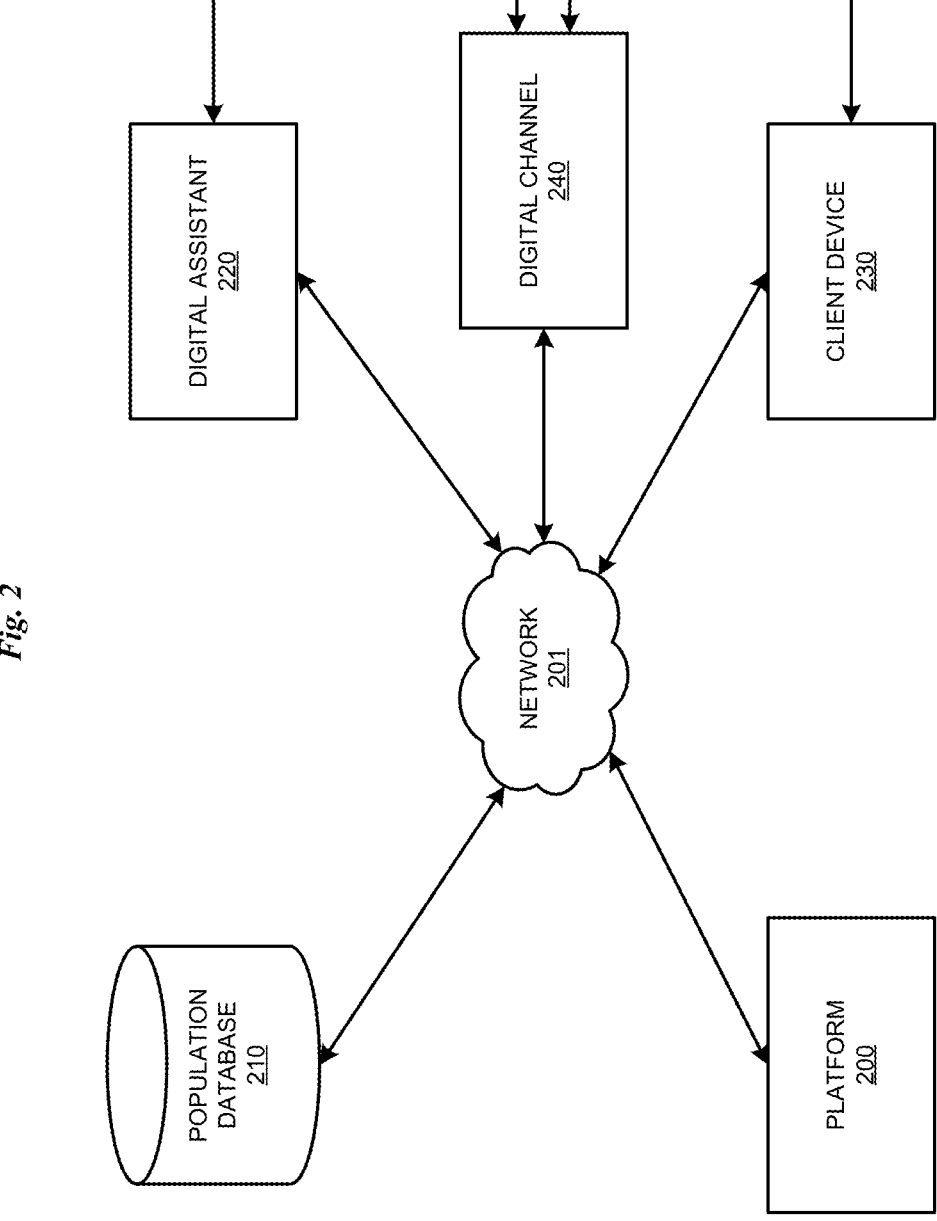
FIG. 2 depicts a block diagram of an example computing environment in accordance with an illustrative embodiment.

With reference to FIG. 2, this figure depicts a block diagram of an example computing environment in accordance with an illustrative embodiment. In the illustrated embodiment, the computing environment includes the ethical virtual assistant training platform 200 of FIG. 1. In an embodiment, components of the depicted computing environment provide a system configured to aggregate ethics-related data and generate domain-specific ethical frameworks to guide interactions and decision-making based of a virtual agent. In an embodiment, platform 200, population database 210, digital assistant 220, client device 230, and digital channel 240 may all communicate with each other over any suitable network 201 (e.g., the Internet).

In the illustrated embodiment, digital assistant 220 receives queries and/or detects user interaction to provide assistance to a user interacting with a digital channel 240 via a client device 230. In an embodiment, digital assistant generates output responses in response to input queries, such output responses tailored under a particular behavior framework. In some other embodiments, the digital assistant 220 provides one or more assistive actions upon request from client device 230. In an embodiment, the digital assistant 220 may be trained to generate one or more suggestions, such as a suggested action, in response to an input query, such that the one more or suggestions complies with a particular behavior framework.

In the illustrated embodiment, population database 210 includes a database configured to store population data received from various population data sources. In an embodiment, the population database 210 includes one or more mechanisms to retrieve data from a variety of ethics data sources. Examples of ethics data sources may include, but are not limited to, legal documents, organizational policies, ethical guidelines from professional bodies, academic papers, industry best practices, online publications, forums, customer feedback, etc. In an embodiment, the population database 210 may include a data storage data schema to configured to provide structured storage to manage different types of ethics data (e.g., rules, guidelines, principles, case studies, historical decisions, etc.).

In an embodiment, platform 200 is configured to construct a behavior framework based on the data stored in the population database 210. In an embodiment, the behavior framework includes a set of interaction guidelines that define responses output by digital assistant 220 during an interaction session. In an embodiment, platform 200 utilizes one or more algorithms or sets of logic to derive a behavior framework by analyzing the data stored on population database 210. In an embodiment, generation of a frameworks may be tailored to a specific domain or industry. In an embodiment, platform 200 defines actionable guidelines for user interactions (e.g., how a virtual assistant should ethically respond in different scenarios, how a user should ethically respond in different scenarios, etc.), based on the behavior framework derived from population data stored on population database 210.

In an embodiment, platform 200 is configured to continuously update model parameters and/or weights of digital assistant 220 based on new population data, user interaction data, and/or feedback from users interacting with digital assistant 220. In an embodiment, platform 200 may be integrated with one or more external systems to provide ethical guidelines to external systems (e.g., AI or automation tools) that may incorporate these ethics into their design and/or operations.

In an embodiment, the digital assistant 220 may be integrated with a digital channel 240 (e.g., application, website, etc.) to provide assistance to a user interacting with digital channel 240 via user device 230. In an embodiment, the digital assistant may be trained according to a behavior framework constructed from population data stored on population database 210. In an embodiment, when a user accesses the digital channel 240 through a client device 230, the digital assistant 220 (integrated with the digital channel)

activates to provide assistance and support to the user over the course of one or more interaction sessions. In an embodiment, the digital assistant 220 leverages one or more natural language processing algorithms configured to understand user queries, commands, or actions within the digital channel and generate relevant actions, responses, and/or suggestions to assist the user in achieving a goals or task. In an embodiment, as the user interacts with the digital channel 240, the digital assistant 220 analyzes the user input and context to provide personalized and contextually relevant assistance. The digital assistant's integration with the digital channel 240 enables the digital assistant 220 to access information, data, and functionalities within the platform to offer ethically aligning support to the user.

In an embodiment, the digital assistant 220 is trained according to a behavior framework constructed from population data stored on the population database 210. In an embodiment, digital assistant 220 is configured to operate within the boundaries of derived ethical guidelines while assisting a user in the digital channel 240. In an embodiment, the behavior framework guides the behavior and decision-making processes of digital assistant 220, ensuring that the responses and suggestions provided to users align with a set of ethical standards and considerations.

In an embodiment, digital assistant 220 is trained to influence the behavior of a user interacting with digital channel 240, by providing responses that cause user input queries to align with the behavior framework. In an embodiment, one or more machine learning algorithms are utilized to leverage historical data to generate responses that influence behavior of a user and/or digital agent.

Figure 3:
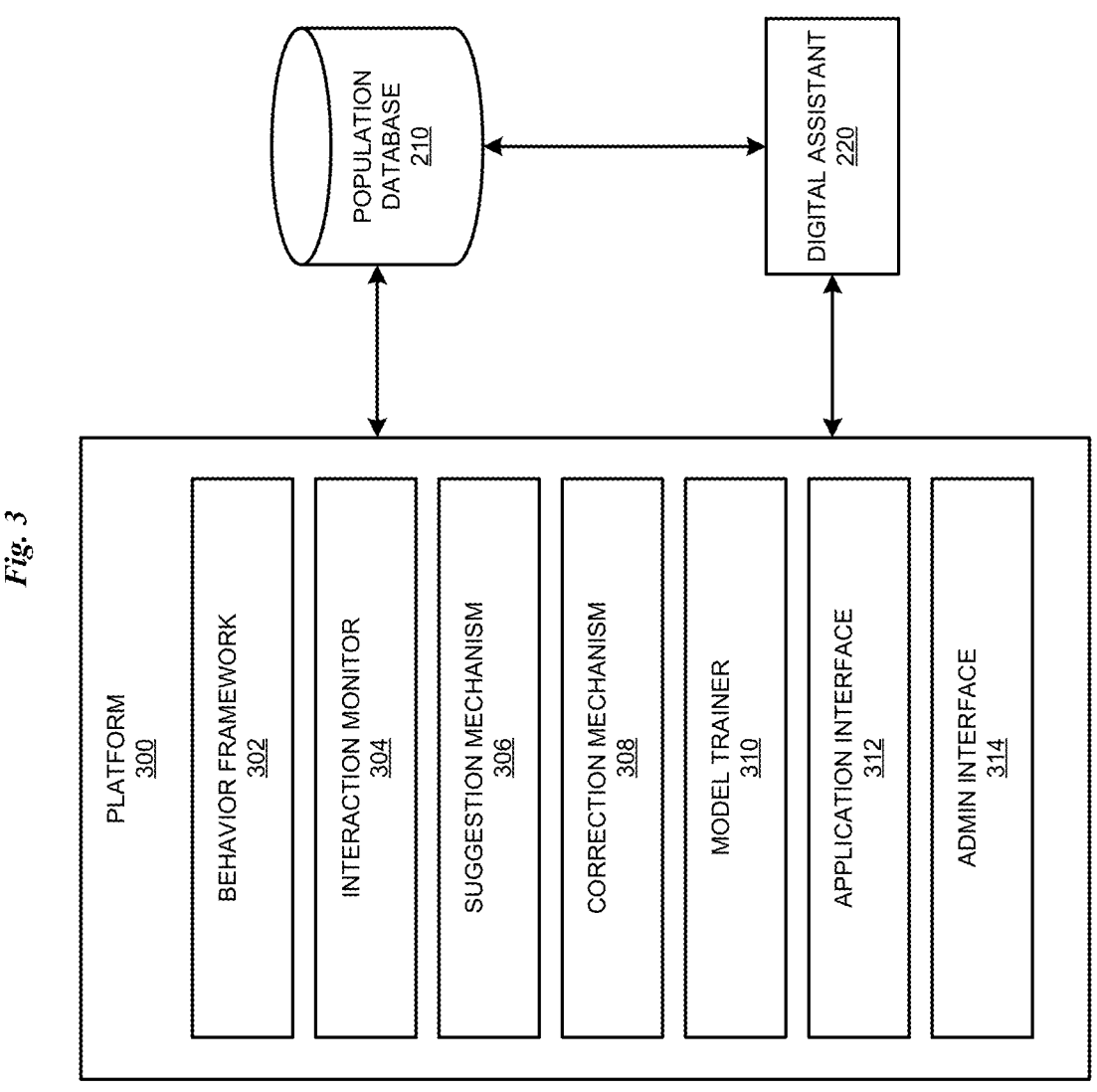
FIG. 3 depicts a block diagram of an example software module for an ethical virtual assistant training platform in accordance with an illustrative embodiment.

With reference to FIG. 3, this figure depicts a block diagram of an example ethical virtual assistant training platform. In the illustrated embodiment, the ethical virtual training platform 300 (or simply "platform 300") includes virtual assistant training platform 200 of FIG. 2. In some embodiments, the platform 300 comprises a physical computing device, including but not limited to, a personal computer, a laptop, a smartphone, a tablet, etc. In some embodiments, the platform 300 comprises specialized hardware, such as for example, an Application-Specific Integrated Circuit (ASIC) or Field-Programmable Gate Array (FPGA) for accelerated processing of specific tasks, routines, algorithms, training operations, etc. In some embodiments, the platform 300 may include a combination of physical and virtualized components, as well as may be partially or entirely virtualized on a virtual machine.

In the illustrated embodiment, the platform 300 is a software module including a plurality of other software modules, including an behavior framework module 302, an interaction monitor module 304, a suggestion mechanism module 306, a correction mechanism module 308, a model trainer module 310, an application interface module 312, and an administrator module 314.

In an embodiment, behavior framework module 302 receives population data from population database 210 and constructs a behavior framework based on the population data received from population database 210. In an embodiment, the behavior framework module 302 includes ethics guidelines derived from the ethics data, which are utilized to train a digital assistant 220 to generate output responses that adhere to a particular established behavior framework. Accordingly, in an embodiment, the behavior framework 302 includes ethics guidelines, such that that may be used to train a digital assistant 220 to produce output responses that align with the behavior framework constructed by behavior framework module 302.

In an embodiment, the interaction monitor module 304 is configured to monitor, track, and/or analyze user interactions with the digital assistant 220. In an embodiment, the interaction monitor module 304 collects data on user queries, responses provided by the digital assistant 220, and contextual information during interactions. This data may be used to evaluate the ethical implications of the interactions and ensure compliance with the behavior framework module 302. In an embodiment, the interaction monitor module 304 interacts with the behavior framework module 302 to compare interaction data against the ethics guidelines and identify any ethical deviations that require correction.

In an embodiment, the suggestion mechanism module 306 generates recommendations and responses for users based on their queries and actions. In an embodiment, the suggestion mechanism module 306 leverages the behavior framework module 302 to ensure that the suggestions align with ethical standards according to a particular behavior framework. In an embodiment, the suggestion mechanism module 306 collaborates with the behavior framework module 302 to validate the ethical integrity of the generated suggestions and adjust them to comply with the ethics guidelines. As described herein, platform 300 may provide an intelligent resolution recommendation system that manifests in the form of an Internet website or a mobile application that is accessible by a client device.

In an embodiment, the correction mechanism module 308 is configuration to rectify and/or correct any deviations and/or potential ethical violations in the output responses to be provided by the digital assistant 220. In an embodiment, the correction mechanism module 308 works in conjunction with the behavior framework module 302 to apply corrective actions to steer the responses towards alignment with the behavior framework. In an embodiment, the correction mechanism module 308 communicates with the suggestion mechanism module 306 to refine future responses and guide user interactions in an ethical manner.

In an embodiment, the model trainer module 310 utilizes one or more machine learning algorithms to train the digital assistant 220 based on the data collected from user interactions and the behavior framework 302. In an embodiment, the model trainer module 310 continuously refines the digital assistant's behavior to ensure that digital assistant 220 produces output responses that meet the ethical standards defined in the behavior framework. In an embodiment, the model trainer module 310 collaborates with the interaction monitor module 304 to analyze user input trends and adjust the training process accordingly to enhance ethical compliance.

In an embodiment, the training data generation process for detecting bias output includes collecting and analyzing historical interaction data to identify instances where the bias was present in a system, a system component, or an output of a system. Training instances are created based on scenarios where an output includes bias and scenarios where an output does not include bias. In an embodiment, the model trainer module 310 is configured to initiate a training process for training a virtual assistant, as described herein. In an embodiment, the training of the virtual assistant may be performed behavior framework, where a behavior framework corresponds to a particular group adhering to that behavior framework. To account for the diverse needs and characteristics of different sectors, a separate model may be established and/or trained for each sector. Additionally, meta-learning and/or transfer learning techniques may be employed to train a model for a particular client, and then may be adapted for other similar clients. Accordingly, it is contemplated herein that this approach enhances the model's ability to generalize across different segments and territories, improving its predictive accuracy and efficiency. In an embodiment, the model trainer module 310 processes historical data, fine-tunes algorithms and/or model parameters, and optimizes model performance based on predefined goals and/or criteria, as discussed in greater detail herein. In an embodiment, the model trainer module 310 computes accurate intrinsic relationships between the input features and bias outputs.

In an embodiment, training a digital assistant 220 to generate output responses that align with a set of guidelines from a behavior framework involves a systematic and iterative process that considers ethical considerations, user feedback, and continuous improvement. Accordingly, the training process causes the digital assistant to be continuously learning, adapting, and refining its responses based on new data, trends, and feedback. The training process aims to equip the virtual assistant with ethics-driven decision-making capabilities. In an embodiment, the training process includes defining the ethical guidelines and principles that form the basis of the behavior framework guiding the virtual assistant's behavior. Also, the virtual assistant is trained using machine learning algorithms and natural language processing techniques to understand user queries, interpret context, and generate appropriate responses that adhere to the behavior framework.

As discussed herein, the training data may include examples of ethical and unethical responses, user interactions, and scenarios that help the virtual assistant learn to recognize and apply ethical principles in its decision-making process. During the training process, the virtual assistant is exposed to a diverse range of scenarios, feedback, and user interactions to refine its responses and behavior according to the behavior framework. The model is continuously evaluated against the ethics guidelines to ensure that its output responses meet the ethical standards set forth in the framework. By incorporating user feedback into the training data, the virtual assistant can learn from user interactions, adapt to user preferences, and improve its ethical decision-making capabilities over time. By integrating ethical considerations into the training process, the virtual assistant can generate output responses that not only meet the guidelines of the behavior framework but also promote ethical behavior in its interactions with users.

In an embodiment, the application interface module 312 serves as the interface through which users and/or applications interact with the digital assistant 220 and facilitates the exchange of information between the users and/or applications and the digital assistant. In an embodiment, the application interface module 312 is configured to interact with any or all other modules within platform 300 to relay user queries, receive output responses, and provide feedback on the effectiveness of the system in adhering to the behavior framework 302. In some embodiments, platform 300 connects with API gateway via any suitable network 201 or combination of networks such as the Internet, etc. and uses any suitable communication protocols such as Wi-Fi, Bluetooth, etc. to connect to platform 300 to digital assistant 220 and/or population database 210. The API gateway may transmit service requests received from a client interacting with digital assistant 220.

In an embodiment, the administrator module 314 includes a user interface configured to allow a user having sufficient privileges to oversee the operation and management of platform 300. In an embodiment, administrator module 314 controls access permissions, monitors system performance, and handles any administrative tasks related to the platform. In an embodiment, the administrator module 314 interacts with any or all other modules to promote compliance with the behavior framework 302. A backend administration system allows users with administrative privileges to perform various administrative tasks associated with the ethical virtual assistant training platform as described herein, such as initiating a data collection and/or correlation process, a neural network training process, defining optimization goals, defining execution parameters/criteria, defining an behavior framework, and any other defined settings discussed herein.

Figure 4:
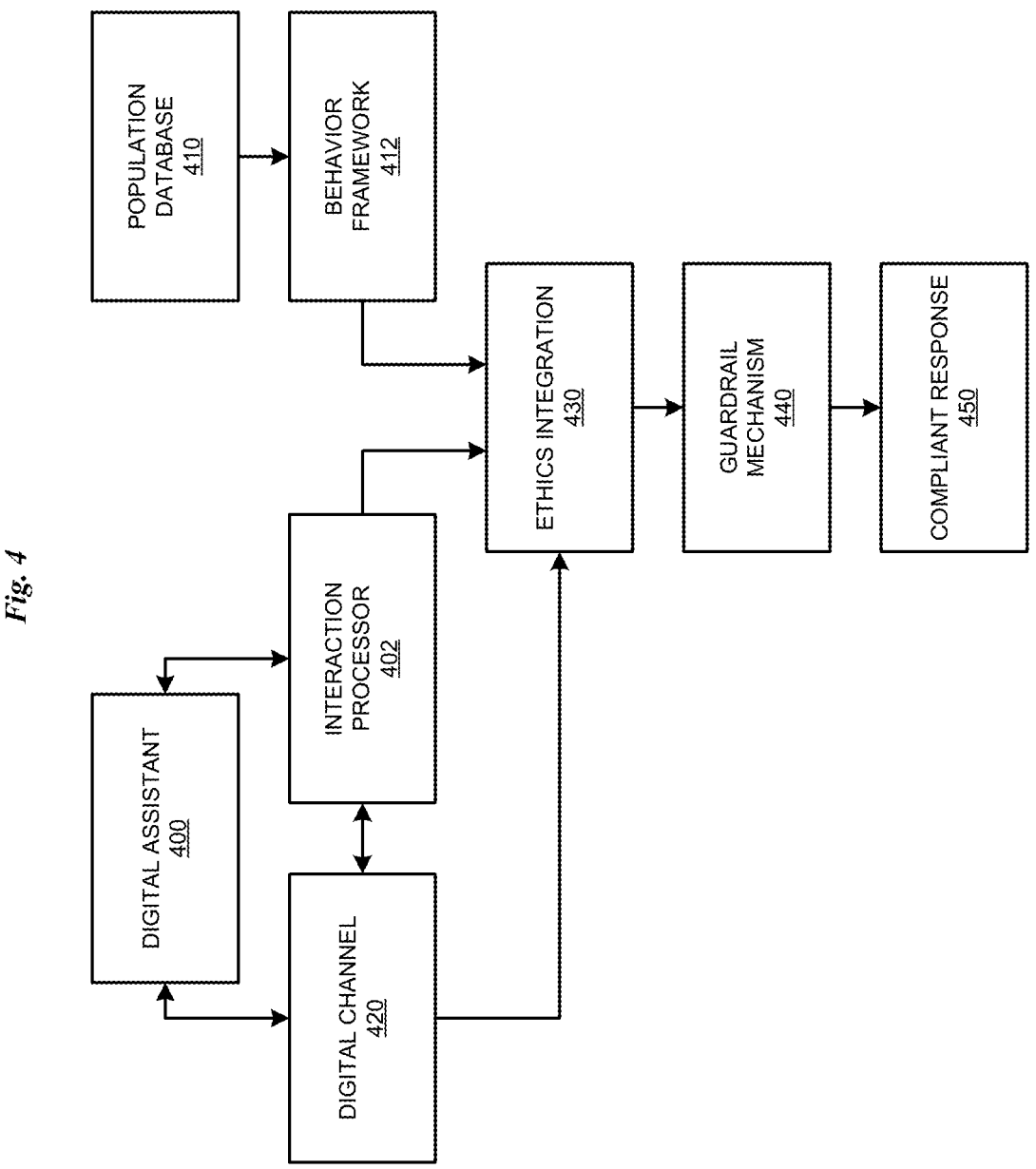
FIG. 4 depicts a block diagram of an example system providing ethical virtual assistance in accordance with an illustrative embodiment.

With reference to FIG. 4, this figure depicts a block diagram of an example system for providing ethical virtual assistance. In the illustrative embodiment, the digital assistant 400 comprises an interaction processor 402, which is responsible for processing user inputs, generating responses, and facilitating interactions within the digital channel 420. The interaction processor 402 may utilize one or more natural language processing algorithms to understand user queries, commands, or actions, and to provide accurate and contextually relevant assistance to users engaging with the digital channel 420. In an embodiment, the system includes utilizing one or more Generative Adversarial Networks (GANs) for training the digital assistant 400. In an embodiment, the interaction processor 402 includes one or more Long Short-Term Memory (LSTM) networks for understanding and processing sequence data in interactions. In an embodiment, the digital channel 420 includes an application through which one or more users interact with the digital assistant 400. By integrating the digital assistant with the digital channel, a user can receive support, feedback, responses recommendations, and/or guidance while navigating the digital channel 420.

In an embodiment, the behavior framework 412 defines ethical guidelines, principles, and standards that the digital assistant 400 adheres to when interacting with users within the digital channel 420. By integrating the behavior framework 412 into the digital assistant's functionality, ethical considerations are embedded into the system, ensuring that user interactions are conducted in an ethical and responsible manner. In an embodiment, the population database 410 includes a repository for storing population data from various sources, including ethical guidelines, legal regulations, industry best practices, user feedback, ethics research, and/or user input. This data may be used to construct the behavior framework 412 that guides the behavior of the digital assistant 400 to ensure that responses and recommendations align with behavior framework 412. By leveraging ethics data from the population database 410, the digital assistant 400 can make informed decisions and provide ethical assistance to users interacting with the digital channel 420.

In the illustrated embodiment, at block 430, the digital assistant 400, behavior framework 412, and digital channel 420 are integrated to provide the functionality described herein to a user interacting with the system. In the illustrated embodiment, at block 440, a guardrail mechanism detects a deviation from behavior framework 412 corresponding to an output response to be provided during an interaction session between a client and digital assistant 400. In an embodiment, the guardrail mechanism may be configured to provide a suggestion to alter to output response to be provided to a client. In an embodiment, the guardrail mechanism may be configured to apply a correction to the output response to be provided to a client, to create a corrected output response that is compliant with behavior framework 412. At block 450, the system provides a compliant response to client that aligns with behavior framework 412.

Figure 5:
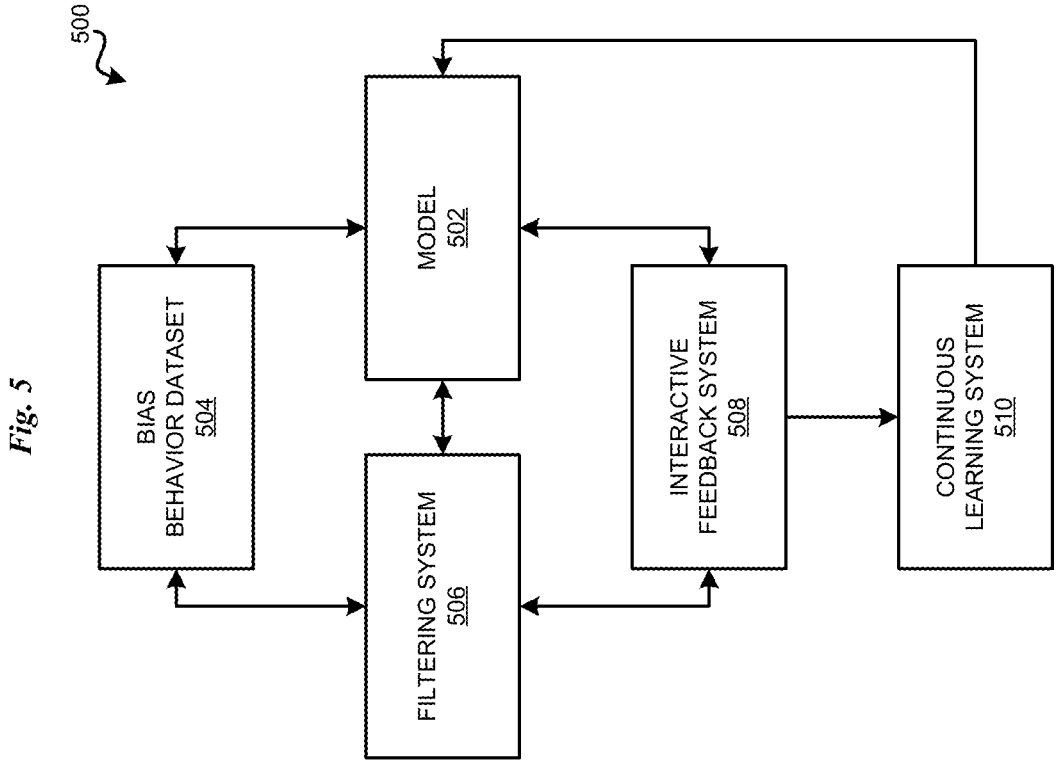
FIG. 5 depicts a block diagram of an example system for training an ethical virtual assistant in accordance with an illustrative embodiment.

With reference to FIG. 5, this figure depicts an example system for training an ethical virtual assistant, in accordance with an illustrative embodiment. In an embodiment, the system 500 includes training a machine learning based model 502 to identify biased behavior. In an embodiment, training a model 502 to identify bias behavior includes leveraging a bias behavior dataset 504 that contains interaction data corresponding to instances of bias behavior. The bias behavior dataset 504 includes data that may be used by the model 502 to learn and recognize patterns, trends, and characteristics associated with biased responses or actions within the context of a virtual assistant's interactions. Also, by incorporating real-world examples of bias behavior into the dataset, the machine learning model 502 gains insights into the various forms of bias that may manifest in the virtual assistant's output responses.

In an embodiment, during the training process, the machine learning model 502 is introduced to the bias behavior dataset to learn how to distinguish between unbiased and biased responses generated by the virtual assistant. In an embodiment, the model 502 analyzes the features, context, and content of the output responses and compares them to the instances of bias behavior in the bias behavior dataset 504. By identifying common attributes or indicators of bias within the responses, the model can develop a predictive understanding of what constitutes bias behavior and how bias behavior may manifest in the virtual assistant's interactions.

By training the machine learning model 502 on the bias behavior dataset, the model learns to detect and flag instances of bias behavior exhibited by the virtual assistant based on the comparison with the dataset bias behavior 504. In an embodiment, the model 502 leverages one or more statistical analysis, pattern recognition, and anomaly detection techniques to identify deviations from unbiased responses and highlight potential bias in the virtual assistant's output. Accordingly, the training process enables the model 502 to make informed decisions and predictions about the presence of bias in the virtual assistant's behavior, helping to mitigate and address bias issues proactively. In an embodiment, the filtering system 506 includes a rule-based post-processing system that further vets the outputs of the model. In an embodiment, this system is configured to eliminate potential false positives to improve the accuracy of bias detections. Accordingly, by leveraging the insights gained from the bias behavior dataset 504, the model can effectively analyze and evaluate the virtual assistant's behavior for signs of bias, contributing to the development of more ethical, fair, and inclusive interactions within the virtual assistant's functionalities.

In an embodiment, the interactive feedback system 508 enables users to provide real-time feedback on the virtual assistant's responses, suggestions, and/or interactions. In an embodiment, the interactive feedback system 508 is configured to enable a user to provide feedback on the accuracy, relevance, clarity, and ethical considerations of the virtual assistant's behavior, helping to improve the quality of the responses and enhance the user experience. In an embodiment, the interactive feedback system 508 allows a user to flag instances of bias behavior, ethical concerns, or inaccuracies in the virtual assistant's output, providing valuable insights for refining the model and addressing potential bias issues. By incorporating user feedback into the system, the virtual assistant can adapt and adjust behavior based on user input over the course of an iterative process of improvement.

In an embodiment, the feedback mechanism is configured to communicate directly with the model, enabling the model to either self-correct upon detecting bias, intervene as a participant, or warn the user about potential biased statements.

In an embodiment, the continuous learning system 510 facilitates the ongoing training and refinement of the machine learning model 502 powering the virtual assistant. In an embodiment, continuous learning system 510 leverages feedback data, interaction data, and insights from the bias behavior dataset 504 to continuously update and enhance the model's capabilities in identifying bias behavior and improving ethical compliance. In an embodiment, the continuous learning system 510 employs one or more techniques such as reinforcement learning, active learning, and model retraining to adapt to new data, trends, and user feedback, ensuring that the virtual assistant remains up-to-date, responsive, and aligned with ethical standards. In an embodiment, the continuous learning system 510 employs one or more Recurrent Neural Networks (RNNs) and Long Short-Term Memory (LSTM) networks to process sequence data during user interactions, enabling the virtual assistant to understand context and ensure morally sound responses. By continuously learning from user interactions and feedback, the system can evolve and improve over time, enhancing its ability to detect and mitigate bias behavior while delivering accurate and up-to-date ethical responses to users.

Figure 6:
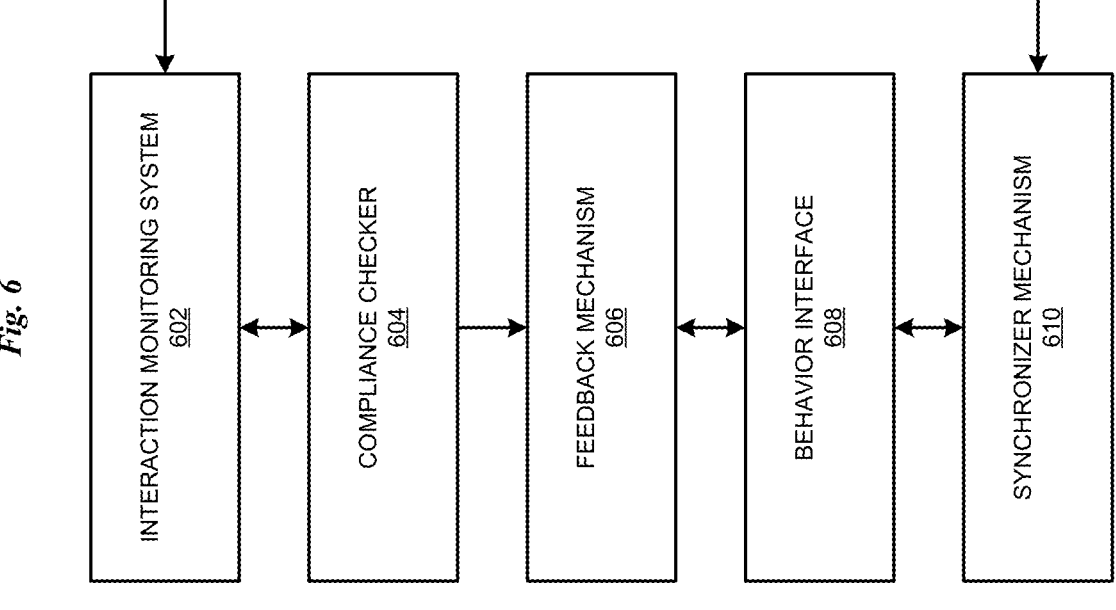
FIG. 6 depicts a block diagram of an example system for providing ethical virtual assistance.

With reference to FIG. 6, this figure depicts a block diagram of an example system for providing ethical virtual assistance in accordance with an illustrative embodiment. In the illustrated embodiment, the system 600 includes an interaction monitoring system 602, a compliance checker 604, a feedback mechanism 606, a behavior interface 608, and a synchronizer mechanism 610.

In the illustrated embodiment, the interaction monitoring system 602 captures nuanced user interactions that may include a combination of emotion, language, and gestures. This is achieved through the integration of emotion recognition algorithms for capturing emotions during interactions, Natural Language Processing (NLP) techniques, such as Transformer-based models (e.g., BERT), for language analysis, and computer vision algorithms, including Convolutional Neural Networks (CNNs), for identifying gestures. The system's ability to capture these intricate details enables a comprehensive understanding of user interactions, facilitating more accurate detection of user behavior to provide more contextually relevant responses.

In the illustrated embodiment, the compliance checker 604 is configured to reference guidelines and principles to ensure adherence by comparing them against the data captured by the interaction monitoring system. By cross-referencing the captured data with behavior framework, the compliance checker maintains ethical integrity within the system, flagging any deviations from the established guidelines.

In the illustrated embodiment, the feedback mechanism 606 includes an immediate feedback system that provides real-time suggestions or corrections based on detected deviations from selected behavior guidelines. This mechanism enables prompt intervention and guidance to address behavior concerns, ensuring that the system's responses align with ethical standards. Further, by offering real-time feedback, the system can continuously improve its ethical decision-making capabilities and enhance user experiences.

In the illustrated embodiment, the behavior interface 608 includes a user interface that allows users or organizations to customize behavior settings according to their preferences. This interface enables configuring and adjusting behavioral parameters and tailoring the system's behavior to align with particular ethical values and requirements. Accordingly, the behavior interface 608 may enable stakeholders to actively participate in defining and enforcing behavioral standards within the system.

In the illustrated embodiment, the synchronizer mechanism 610 is a module configured to establish a bidirectional communication link with the ethical virtual assistant training platform to fetch, apply, and update behavioral settings based on customizations made via the behavior interface 608. The synchronizer mechanism 610 provides integration between the system and the training platform, enabling the synchronization of behavioral settings and configurations to maintain consistency and alignment with the defined behavior framework. The synchronizer mechanism facilitates efficient communication and coordination between the system components and the training platform, ensuring that ethical considerations are consistently applied and updated throughout the system.

Figure 7:
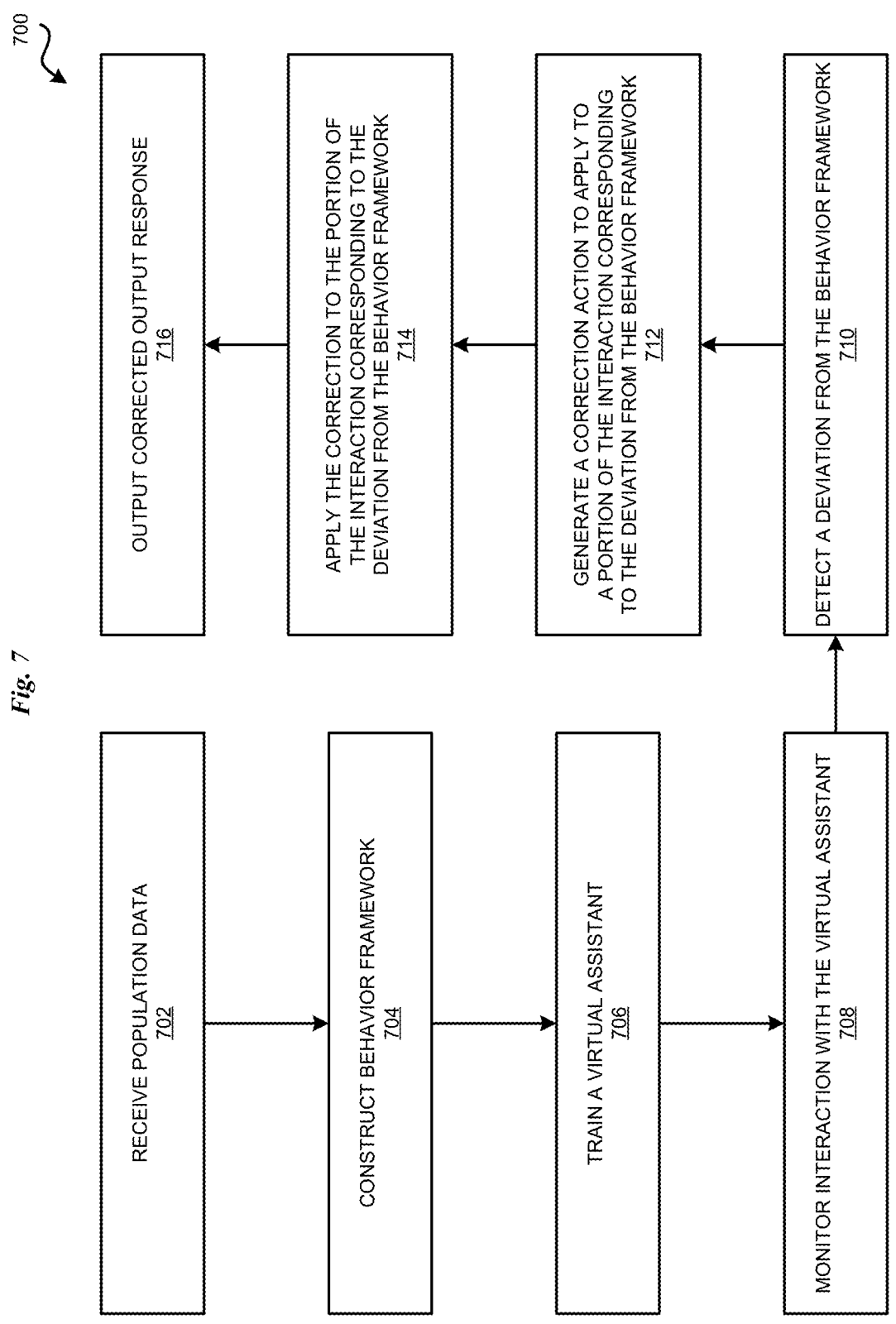
FIG. 7 depicts a flowchart of an example process for providing ethical virtual assistance in accordance with an illustrative embodiment.

With reference to FIG. 7, this figure depicts a flowchart of an example process for providing ethical virtual assistance in accordance with an illustrative embodiment. In an embodiment, the ethical virtual assistant training platform 200 of FIGS. 1 and 2 and/or the platform 300 of FIG. 3 carries out the process 700.

In an embodiment, at step 702, the process receives population data. In an embodiment, the process receives population data from a population database. In an embodiment, the process includes establishing a population database based on ethics related data obtained from various data sources. Examples of data sources of ethics data may include, but are not limited to, legal documents, organizational policies, ethical guidelines from professional bodies, academic papers, industry best practices, online publications, forums, customer feedback, etc.

In an embodiment, at step 704, the process constructs a behavior framework. In an embodiment, the process constructs a behavior framework based on ethics data stored on the population database. In an embodiment, the process includes deriving the behavior framework from the ethics data stored on the population database. In an embodiment, the behavior framework includes a set of guidelines that define permissible actions and/or output responses of a virtual assistant programmed to interact with a client.

In an embodiment, at step 706, the process includes training a virtual assistant. In an embodiment, the virtual assistant is trained according to the behavior framework derived from ethics data stored on the population database. In an embodiment, the virtual assistant may be instructed to behave according to guidelines defined by the behavior framework Further, through exposure to a diverse range of scenarios, including biased and unbiased interactions, the virtual assistant learns to recognize patterns, trends, and indicators of bias in its output responses. By analyzing and comparing biased and unbiased scenarios, the virtual assistant develops a nuanced understanding of ethical considerations and bias detection, enabling the virtual assistant to identify and mitigate biased responses before transmitting them to users.

In an embodiment, at step 708, the process monitors interaction with the virtual assistant. In an embodiment, the process monitors interaction corresponding to an interaction session between a client and the virtual assistant to detect any possible output responses that may deviate from guidelines established by the behavior framework. Accordingly, by monitoring the interaction data, the process can identify instances or portions of an interaction session where the virtual assistant's responses may exhibit bias, discrimination, or ethical concerns.

In an embodiment, at step 710, the process detects a deviation from the behavior framework within the interaction data corresponding to an interaction session. By comparing the interaction data against the predefined behavior framework, the process can identify instances where the virtual assistant's actions or outputs exhibit bias, discrimination, or ethical lapses. In an embodiment, the process flags or highlights any discrepancies from the behavior framework, enabling manual intervention and corrective actions to address and rectify the identified deviations.

In an embodiment, at step 712, the process generates a correction action to apply to a portion of the interaction corresponding to the deviation from the behavior framework. In an embodiment, the correction action is designed to rectify any identified ethical lapses, biases, or deviations detected within the interaction session. The process may utilize one or more predefined rules, guidelines, and algorithms to determine the appropriate corrective measures to apply to the specific portion of the interaction data that does not align with the ethical standards set forth in the behavior framework. In an embodiment, the correction action may include modifying the virtual assistant's response, providing additional context or information to mitigate bias, or offering alternative suggestions that adhere to ethical guidelines. By generating targeted correction actions, the process ensures that user experiences are guided by ethical considerations.

In an embodiment, at step 714, the process applies the correction action to the portion of the interaction corresponding to the deviation from the behavior framework. By applying the correction action to the portion of the interaction data that does not align with the behavior framework, the process may modify the virtual assistant's response, behavior, or decision-making process to ensure ethical compliance. In an embodiment, the correction action may include adjusting the language, tone, or content of the response, providing additional context or explanations to mitigate bias, or suggesting alternative courses of action that align with behavior framework.

In an embodiment, at step 716, the process outputs a corrected output response. In an embodiment, the corrected output response is such that the corrected output response aligns with and/or is compliant with the behavior framework. By incorporating the corrections identified during the monitoring and correction process, the corrected output response is tailored to align with and ensure compliance with the behavior framework established for the virtual assistant. Further, through this iterative process of monitoring, detecting, correcting, and outputting responses, the process enhances the ethical integrity of the virtual assistant's behavior, and develops a more diverse, ethical and inclusive environment for interactions within the platform.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

establishing a population database, the population database configured to transmit and store population data;

constructing a behavior framework based on population data stored on the population database;

constructing a second behavior framework based on population data stored on the population database;

initiating a training process to train a virtual assistant to generate an output response in response to a query, wherein the training process comprises training the virtual assistant to generate responses according to the behavior framework;

initiating a second training process to train a second virtual assistant to generate an output response in response to a query, wherein the second training process comprises training the second virtual assistant to generate responses according to the second behavior framework;

monitoring an interaction session between a client interacting with the virtual assistant to detect a deviation from the behavior framework;

generating, upon detection of the deviation from the behavior framework, a correction action to apply to a portion of the interaction session corresponding to the deviation from the behavior framework;

applying the correction action to the portion of the interaction session corresponding to the deviation from the behavior framework;

outputting a corrected output response, wherein the corrected output response meets a set of guidelines of the behavior framework;

monitoring a second interaction session between a second client interacting with the second virtual assistant to detect a deviation from the second behavior framework;

generating, upon detection of the deviation from the second behavior framework, a second correction action to apply to a portion of the second interaction session corresponding to the deviation from the second behavior framework;

applying the second correction action to the portion of the second interaction session corresponding to the deviation from the second behavior framework; and outputting a second corrected output response, wherein the second corrected output response meets a set of guidelines of the second behavior framework.

2. The computer-implemented method of claim 1, wherein the second behavior framework comprises a different set of guidelines than the behavior framework.

3. The computer-implemented method of claim 1, wherein the correction action comprises modifying the portion of the interaction session corresponding to the deviation from the behavior framework.

4. The computer-implemented method of claim 1, wherein the correction action comprises providing a suggested action to mitigate a potential bias outcome.

5. The computer-implemented method of claim 1, wherein the correction action comprises providing additional context surrounding the portion of the interaction session corresponding to the deviation from the behavior framework.

6. A computer program product comprising one or more computer readable storage media, and program instructions collectively stored on the one or more computer readable storage media, the program instructions executable by a processor to cause the processor to perform operations comprising:

establishing a population database, the population database configured to transmit and store population data;

constructing a behavior framework based on population data stored on the population database;

constructing a second behavior framework based on population data stored on the population database;

initiating a training process to train a virtual assistant to generate an output response in response to a query, wherein the training process comprises training the virtual assistant to generate responses according to the behavior framework;

initiating a second training process to train a second virtual assistant to generate an output response in response to a query, wherein the second training process comprises training the second virtual assistant to generate responses according to the second behavior framework;

monitoring an interaction session between a client interacting with the virtual assistant to detect a deviation from the behavior framework;

generating, upon detection of the deviation from the behavior framework, a correction action to apply to a portion of the interaction session corresponding to the deviation from the behavior framework;

applying the correction action to the portion of the interaction session corresponding to the deviation from the behavior framework:

outputting a corrected output response, wherein the corrected output response meets a set of guidelines of the behavior framework;

monitoring a second interaction session between a second client interacting with the second virtual assistant to detect a deviation from the second behavior framework;

generating, upon detection of the deviation from the second behavior framework, a second correction action to apply to a portion of the second interaction session corresponding to the deviation from the second behavior framework;

applying the second correction action to the portion of the second interaction session corresponding to the deviation from the second behavior framework; and outputting a second corrected output response, wherein the second corrected output response meets a set of guidelines of the second behavior framework.

7. The computer program product of claim 6 wherein the program instructions are stored in a computer readable storage device in a data processing system, and wherein the stored program instructions are transferred over a network from a remote data processing system.

8. The computer program product of claim 6, wherein the program instructions are stored in a computer readable storage device in a server data processing system, and wherein the program instructions are downloaded in response to a request over a network to a remote data processing system for use in the computer readable storage device associated with the remote data processing system, further comprising:

program instructions to meter use of the program instructions associated with the request; and program instructions to generate an invoice based on the metered use.

9. The computer program product of claim 6, wherein the set of guidelines of the second behavior framework is different from the set of guidelines of the behavior framework.

10. The computer program product of claim 6, wherein the correction action comprises modifying the portion of the interaction session corresponding to the deviation from the behavior framework.

11. The computer program product of claim 6, wherein the correction action comprises providing a suggested action to mitigate a potential bias outcome.

12. The computer program product of claim 6, wherein the correction action comprises providing additional context surrounding the portion of the interaction session corresponding to the deviation from the behavior framework.

13. A computer system comprising a processor and one or more computer readable storage media, and program instructions collectively stored on the one or more computer readable storage media, the program instructions executable by the processor to cause the processor to perform operations comprising:

establishing a population database, the population database configured to transmit and store population data;

constructing a behavior framework based on population data stored on the population database;

constructing a second behavior framework based on population data stored on the population database;

initiating a training process to train a virtual assistant to generate an output response in response to a query, wherein the training process comprises training the virtual assistant to generate responses according to the behavior framework;

initiating a second training process to train a second virtual assistant to generate an output response in response to a query, wherein the second training process comprises training the second virtual assistant to generate responses according to the second behavior framework;

monitoring an interaction session between a client inter-
acting with the virtual assistant to detect a deviation
from the behavior framework;

generating, upon detection of the deviation from the
behavior framework, a correction action to apply to a
portion of the interaction session corresponding to the
deviation from the behavior framework;

applying the correction action to the portion of the inter-
action session corresponding to the deviation from the
behavior framework;

outputting a corrected output response, wherein the cor-
rected output response meets a set of guidelines of the
behavior framework;

monitoring a second interaction session between a second
client interacting with the second virtual assistant to
detect a deviation from the second behavior frame-
work;

generating, upon detection of the deviation from the
second behavior framework, a second correction action
to apply to a portion of the second interaction session
corresponding to the deviation from the second behav-
ior framework;

applying the second correction action to the portion of the
second interaction session corresponding to the devia-
tion from the second behavior framework; and outputting a second corrected output response, wherein
the second corrected output response meets a set of
guidelines of the second behavior framework.

14. The computer system of claim 13, wherein the second
behavior framework comprises a different set of guidelines
than the behavior framework.

15. The computer system of claim 13, wherein the cor-
rection action comprises modifying the portion of the inter-
action session corresponding to the deviation from the
behavior framework.

16. The computer system of claim 13, wherein the cor-
rection action comprises providing a suggested action to
mitigate a potential bias outcome.

17. The computer system of claim 13, wherein the cor-
rection action comprises providing additional context sur-
rounding the portion of the interaction session correspond-
ing to the deviation from the behavior framework.

\* \* \* \* \*